United States Patent
Jandak et al.

(10) Patent No.: US 10,753,744 B2
(45) Date of Patent: Aug. 25, 2020

(54) MEMS OUT OF PLANE ACTUATOR

(71) Applicant: Honeywell International Inc., Morris Plains, NJ (US)

(72) Inventors: Mikulas Jandak, Vienna (AT); Tomas Neuzil, Brno (CZ); Hana Krausova, Brno (CZ); Michael Schneider, Vienna (AT); Ulrich Schmid, Vienna (AT)

(73) Assignee: Honeywell International Inc., Morris Plains, NJ (US)

( * ) Notice: Subject to any disclaimer, the term of this patent is extended or adjusted under 35 U.S.C. 154(b) by 317 days.

(21) Appl. No.: 15/459,293

(22) Filed: Mar. 15, 2017

(65) Prior Publication Data

US 2018/0266823 A1   Sep. 20, 2018

(51) Int. Cl.
| | | |
|---|---|---|
| *G01C 19/5719* | (2012.01) | |
| *G01C 19/5733* | (2012.01) | |
| *G01C 19/5755* | (2012.01) | |
| *G01C 19/56* | (2012.01) | |

(52) U.S. Cl.
CPC ......... *G01C 19/5755* (2013.01); *G01C 19/56* (2013.01); *G01C 19/5719* (2013.01); *G01C 19/5733* (2013.01)

(58) Field of Classification Search
None
See application file for complete search history.

(56) References Cited

U.S. PATENT DOCUMENTS

| | | |
|---|---|---|
| 5,969,848 A | 10/1999 | Lee et al. |
| 6,838,738 B1 | 1/2005 | Costello et al. |
| 7,213,458 B2 | 5/2007 | Weber et al. |
| 7,231,824 B2 | 6/2007 | French et al. |
| 7,355,318 B2 | 4/2008 | Dean, Jr. et al. |
| 7,444,868 B2 | 11/2008 | Johnson |
| 7,444,869 B2 | 11/2008 | Johnson et al. |
| 7,999,635 B1 | 8/2011 | Quevy et al. |

(Continued)

OTHER PUBLICATIONS

European Patent Office, "Extended European Search Report from EP Application No. 18161335.7 dated Jul. 25, 2018", from Foreign Counterpart of U.S. Appl. No. 15/459,293, Jul. 25, 2018, p. 1-11, Published in: EP.

(Continued)

*Primary Examiner* — Jill E Culler
*Assistant Examiner* — Ruben C Parco, Jr.
(74) *Attorney, Agent, or Firm* — Fogg & Powers LLC

(57) ABSTRACT

A MEMS sensor device comprises a support substrate, a proof mass movably connected to the support substrate, a first drive comb fixedly connected to the support substrate in a first orientation and adjacent to the proof mass, and a second drive comb fixedly connected to the support substrate in a second orientation and adjacent to the proof mass. The second orientation is opposite of the first orientation such that the first and second drive combs face toward each other. A parallel plate sense electrode is located under the proof mass on the support substrate. The drive combs and the parallel plate sense electrode are each electrically charged and configured with respect to the proof mass such that a combination of a levitation force and a parallel plate force produces a linear out-of-plane actuation that depends only on an applied voltage.

20 Claims, 14 Drawing Sheets

(56) References Cited

U.S. PATENT DOCUMENTS

| | | | | |
|---|---|---|---|---|
| 2004/0112133 A1* | 6/2004 | Glenn | ............ | B81B 3/0051 |
| | | | | 73/504.12 |
| 2007/0039386 A1* | 2/2007 | Stewart | ............ | G01C 19/56 |
| | | | | 73/504.14 |
| 2013/0312520 A1* | 11/2013 | Kho | ............ | G01C 19/5726 |
| | | | | 73/504.12 |
| 2014/0144231 A1 | 5/2014 | Lin et al. | | |

OTHER PUBLICATIONS

Hammer, "Analytical Model for Comb Capacitance Fringe Fields", Journal of Microelectromechanical Systems vol. 19, Issue: 1, Feb. 2010, pp. 18, Published in: US.

Imboden et al., "Controlling Levitation and Enhancing Displacement in Electrostatic Comb Drives of MEMS Actuators", Journal of Microelectromechanical Systems, vol. 23, No. 5, Oct. 2014, pp. 1063-1072, Publisher: 1057-7157, 2014 IEEE, Published in: US.

Kempe, "Inertial MEMS Principles and Practice", www.cambridge.org/9780521766586, 2011, pp. C-475, Publisher: Cambridge University Press 2011, Published in: US.

Tang et al, "Electrostatic Comb Drive Levitation and Control Method", Journal of Microelectromechanical Systems, Dec. 1992, pp. 170-178, vol. 1, No. 4, Publisher: IEEE.

Timpe et al., "Levitation compensation method for dynamic electrostatic comb-drive actuators", Science Direct Sensors and Actuators A., Feb. 7, 2008, pp. 383-389, No. 143, Publisher Elsevier.

European Patent Office, "Communication under Rule 71(3) from EP Application No. 18161335.7 dated Jul. 11, 2019", from Foreign Counterpart to U.S. Appl. No. 15/459,293, pp. 136, Published: EP.

Tang et al., "Electrostatically Balanced Comb Drive for Controlled Levitation", 1990, pp. 23-27, IEEE.

* cited by examiner

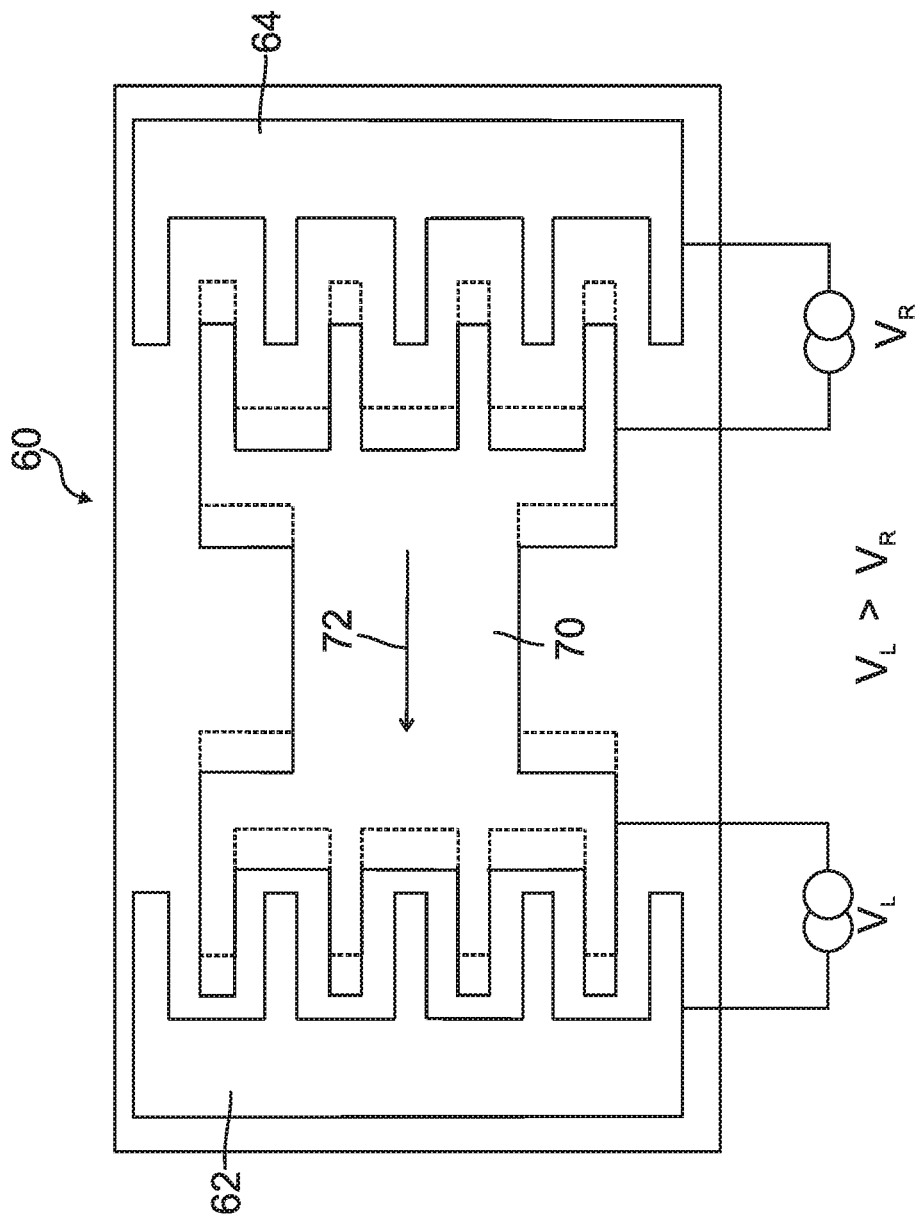

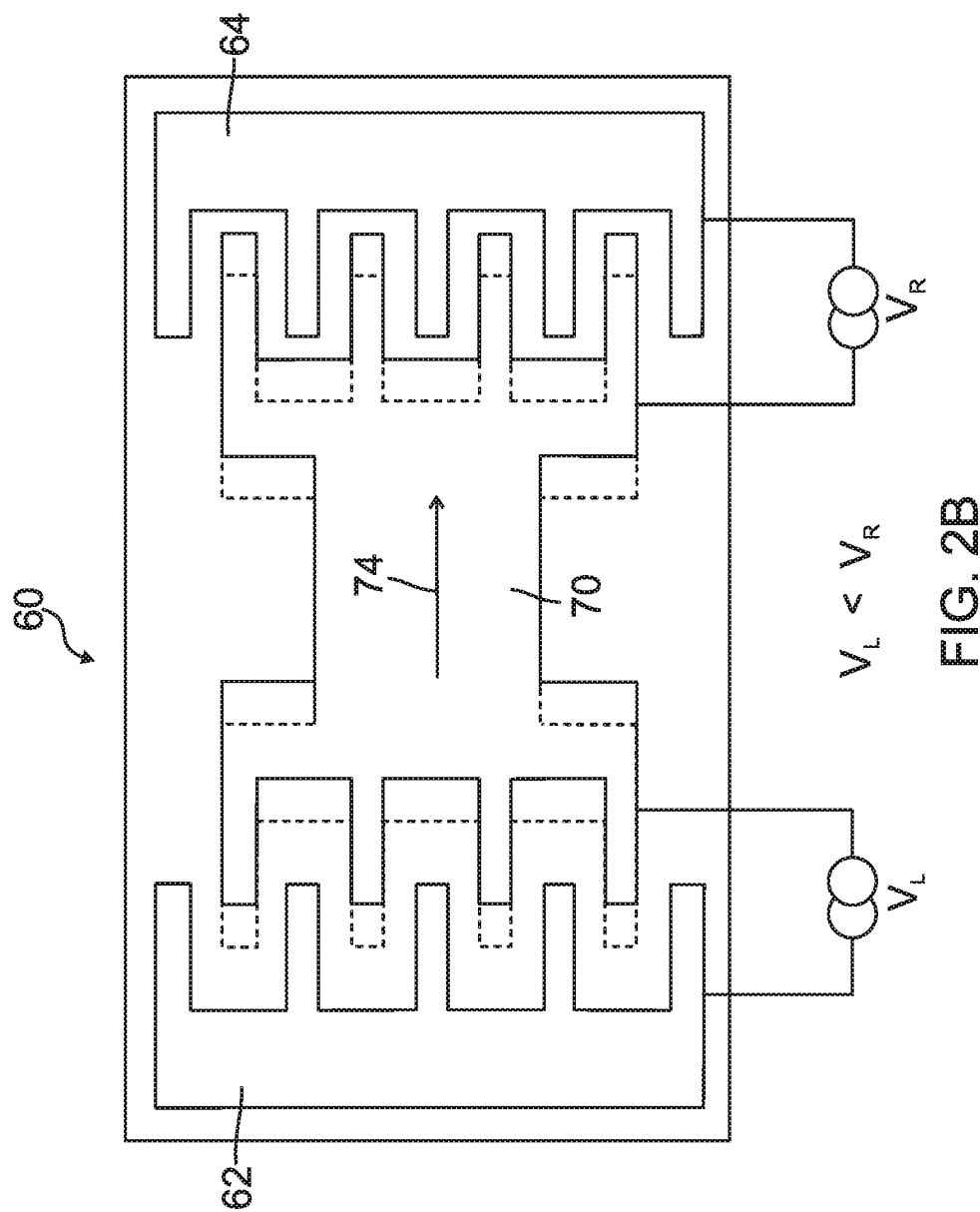

MEMS OUT OF PLANE ACTUATOR

BACKGROUND

When micro-electro-mechanical systems (MEMS) devices such as MEMS inertial sensors are subject to external forces such as vibration, functionality may be lost and/or performance may be compromised. There have been various approaches to address how to reduce vibration of MEMS sensors.

In one prior approach, a comb drive was used to create an out-of-plane force to reduce vibration in a MEMS device. This approach is based on using a fringe field of the comb drive, which does not have a substrate beneath. Consequently, this approach is not usable for devices that do have electrodes beneath the comb drive (e.g., out-of-plane accelerometer and in-plane gyroscope). Moreover, the force produced is non-linear around zero deflection since it depends on displacement out-of-plane.

In another prior approach, a method for quadrature reduction in MEMS gyroscope devices uses a set of parallel plate electrodes to compensate for quadrature movement. However, using such electrodes to compensate motion out-of-plane results in a non-linear force, and if a DC bias is used, a change of resonant frequency. Moreover, a parallel plate actuator in unstable for higher actuation voltages.

While MEMS gyroscopes generally provide good angle random walk (ARW), robustness against severe shocks and vibration, and bias stability for certain applications, is inadequate. The reduction of bias can be achieved by improving the manufacturing process, by solving the problem at the system level, such as adding in-run calibration or by compensating the movement with electrostatic actuators. Nevertheless, the actuation in out-of-plane direction is more complicated as opposed to in-plane, since out-of-plane actuators based on parallel plate electrodes are inherently non-linear. Moreover, if single sided manufacturing technology is used, parallel plate force can act only in one direction. The in-plane actuation is less complicated due to the possibility to use drive combs which are linear actuators.

Accordingly, there is a need to actuate MEMS devices in an out-of-plane direction by a linear force, which is independent of both in-plane and out-of-plane displacement.

SUMMARY

A MEMS sensor device comprises a support substrate, a proof mass movably connected to the support substrate, a first drive comb fixedly connected to the support substrate in a first orientation and adjacent to the proof mass, and a second drive comb fixedly connected to the support substrate in a second orientation and adjacent to the proof mass. The second orientation is opposite of the first orientation such that the first and second drive combs face toward each other. A parallel plate sense electrode is located under the proof mass on the support substrate. The first and second drive combs, and the parallel plate sense electrode, are each electrically charged and configured with respect to the proof mass such that a combination of a levitation force and a parallel plate force produces a linear out-of-plane actuation for the MEMS sensor device that depends only on an applied voltage.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIGS. 2A and 2B are schematic diagrams of a MEMS device, which show the opposing forces acting on a moveable structure of the MEMS device;

DETAILED DESCRIPTION

Figure 1A:
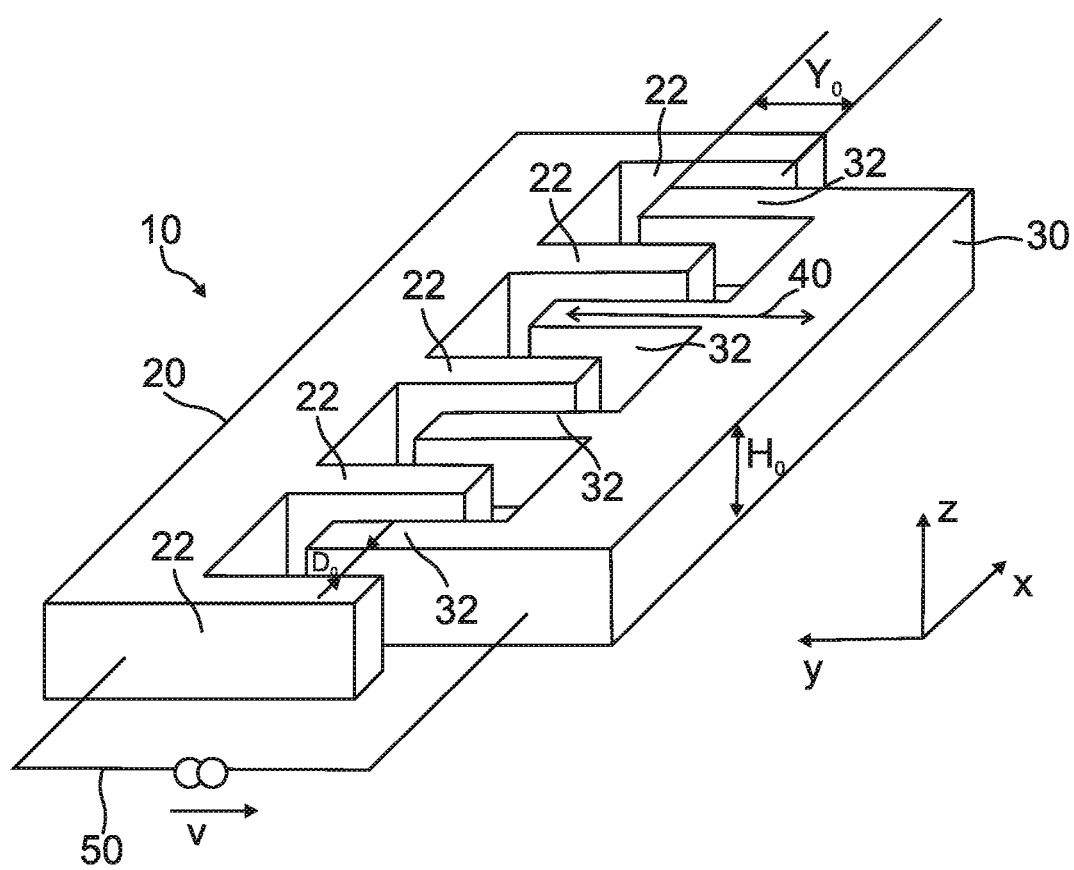
FIG. 1A is an isometric view of a conventional drive comb that can be employed in a MEMS device.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A micro-electro-mechanical systems (MEMS) out-of-plane actuator for MEMS devices is disclosed herein that is configured to use a combination of a parallel plate force and a levitation force. The levitation force acts in the opposite direction as the parallel plate force and shows inverse non-linear behavior. By combining both of these forces, a linear out-of-plane actuator can be implemented.

The levitation force is a non-linear force that depends on in-plane deflection (x), out-of-plane deflection (z), and applied voltage (V). The parameters of the levitation force are defined by geometry of the drive comb (overlap, gap between proof mass, and dimension of drive comb fingers). The parallel plate force is a non-linear force that depends on out-of-plane deflection, applied voltage, gap between the structure and the plate, and depends on in-plane deflection if the area of the parallel plate is designed such that it changes over in-plane motion. The force dependence on x and/or z is undesirable in most cases. Therefore, the present actuator uses such arrangement and combination of both levitation and parallel plate forces to arrive at a force that acts out-of-plane and which depends only on applied voltage.

If the parallel plate sense electrodes have constant area or are designed such that the sum of area of both electrodes is constant, there is no force acting in-plane. Linearization of the parallel plate and combining the linearized force with levitation, and realizing that both forces act in opposite directions, a specific condition is obtained. If the design fulfills such condition, a linear actuator can be achieved. The extent to which the force is linear depends on the design of both the drive comb and parallel plate actuator, and the out-of-plane displacement.

The present linear out-of-plane actuator allows for higher yield and/or higher performance MEMS inertial sensors to be produced. The linear out-of-plane actuator can be also used to improve the dynamics of MEMS inertial sensors by using the actuator in a force feedback loop.

The present approach is particularly suited for use in high performance MEMS inertial sensors, such as MEMS accelerometers and MEMS gyroscopes, which are manufactured by single sided manufacturing technologies. The present technique can be used to reduce vibration sensitivity of single sense plate gyroscopes and accelerometers using levitation and parallel plate actuators.

Further details of the present approach are described hereafter with reference to the drawings.

The drive comb of a MEMS device includes two sets of electrodes with interdigitated comb fingers. One set of electrodes is fixed to a substrate (static) and the other set of electrodes is movable. When a voltage is applied between the electrodes, the electrostatic force drives the movable set of electrodes towards the static set of electrodes.

A symmetrical drive comb, with both static and movable drive comb electrodes having the same thickness, can be used for in-plane and small out-of-plane movement. Such a symmetrical drive comb has the advantage that the in-plane force is independent of deflection. Strictly speaking, the force is constant if the capacitance is linearly proportional to the displacement. Consequently, the drive comb is linear only when the motion is within the overlap of about 10% or greater. When the motion reaches 0% of overlap, the fringe capacitance (edges of comb fingers) start to dominate and therefore the entire capacitance does not depend linearly on displacement and the force is non-linear. However, a linear range can be designed by using comb fingers with adequate length. The drive comb is the actuator of choice for many devices since the drive comb offers linear scaling with applied voltage and allows for large displacement.

FIG. 1A illustrates a conventional drive comb 10 that can be employed in a MEMS sensor device, for example. The drive comb 10 includes a fixed electrode 20 having a first set of comb fingers 22, and a movable electrode 30 having a second set of comb fingers 32. The first and second sets of comb fingers 22, 32 face each other in an interdigitated configuration. The fixed electrode 20 and the movable electrode 30 have the same height ($H_0$), and are positioned with respect to each other such that a comb finger spacing ($D_0$) exists between each interdigitated comb finger 22, 32 in an x direction. A comb finger overlap ($Y_0$) exists between each interdigitated comb finger 22, 32 in the y direction. The movable electrode 30 can travel back and forth along the y direction as indicated by arrow 40. A voltage (V) applied at electrical connection 50 provides the electrostatic force that drives movable electrode 30 towards fixed electrode 20.

The capacitance (C) of drive comb 10 can be described by the following equation:

$$C = \varepsilon_0 N [H_0 - f(z)] * (Y_0 - y) * \left( \frac{1}{D_0 + x} + \frac{1}{D_0 - x} \right)$$

The force (F) along the y direction is defined as a partial derivative along that direction multiplied by $$\frac{1}{2} V^2.$$

For example, the force in the y direction is defined as:

$$F_y = \frac{1}{2} V^2 \frac{\partial C}{\partial y}$$

The forces in drive comb 10 of FIG. 1A can therefore be described as follows in Table 1.

TABLE 1

| Direction | Force | Notes |
| --- | --- | --- |
| Y | $\frac{1}{2} V^2 \frac{\partial C}{\partial y} = \varepsilon_0 N V^2 \frac{H_0}{D_0}$ | Force independent of displacement in y direction; scales with voltage square; always attracts movable towards static part. |
| Z | $\frac{1}{2} V^2 \frac{\partial C}{\partial z} = \varepsilon_0 V^2 \frac{N}{D_0} Y \alpha z$ | Valid when there is no substrate beneath. Force depends on displacement but only for small z; for larger z, force independent of z; there is no force if there is no deflection. |
| X | $\frac{1}{2} V^2 \frac{\partial C}{\partial x} = 2 \varepsilon_0 V^2 N D_0 Y_0 \frac{H_0}{(D_0^2 - x^2)^2} x$ | Force depends on displacement (x); force may cause collapse of the structure since when x increases (fingers approach each other) → force increases; this force is balanced (x = 0) and therefore force = 0 mostly. |

Figure 1B:
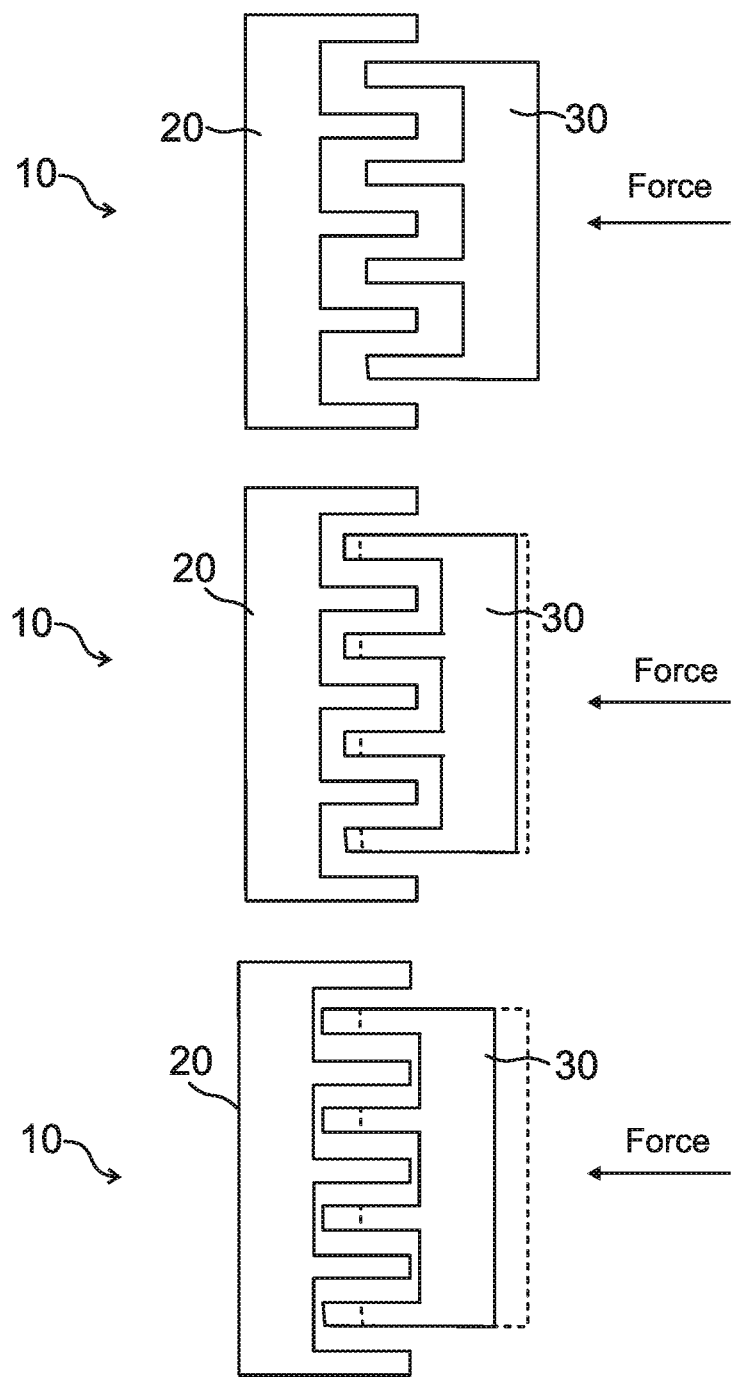
FIG. 1B is a diagram of the size and direction of the force acting in-plane on moveable structures of the drive comb of FIG. 1A.
Figure 3A:
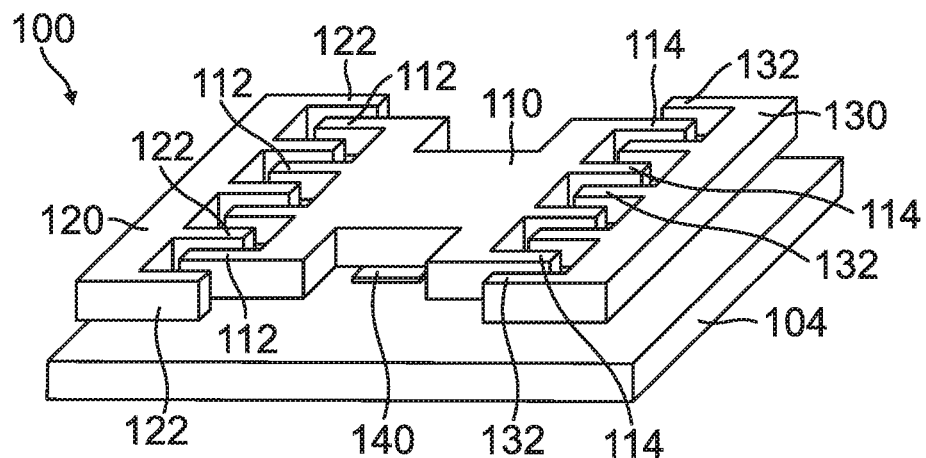
FIG. 3A is an isometric view of a micro-electro-mechanical systems (MEMS) sensor device according to one embodiment, which can be implemented as an out of plane actuator.
Figure 3B:
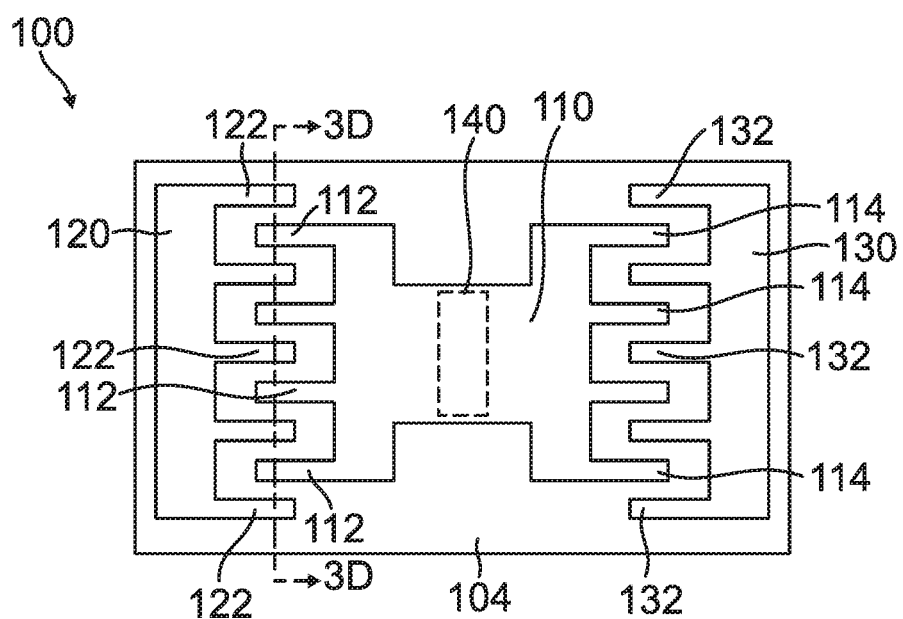
FIG. 3B is a top view of the MEMS sensor device shown in FIG. 3A.
Figure 3C:
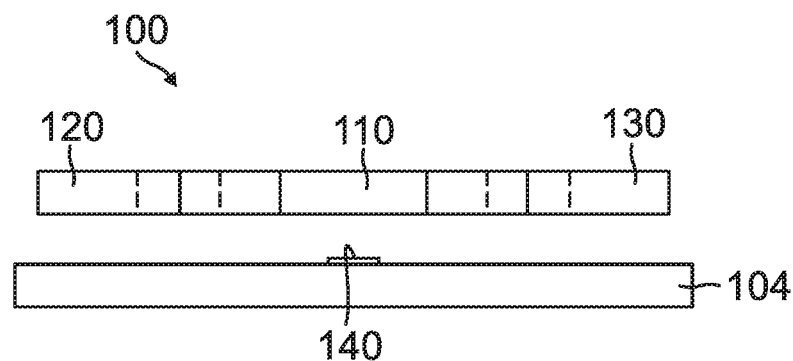
FIG. 3C is a front view of the MEMS sensor device shown in FIG. 3A.
Figure 3D:
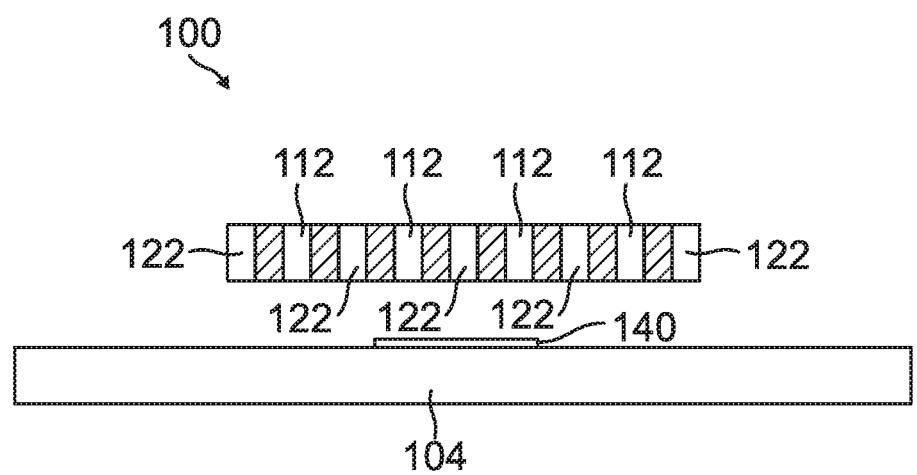
FIG. 3D is a cross-sectional side view of the MEMS sensor device shown in FIG. 3B taken along line 3D-3D.

The size and direction of the force acting in-plane for drive comb 10 is shown in the diagram of FIG. 1B, with the fixed structure corresponding to fixed electrode 20, and the movable structure corresponding to movable electrode 30. The dashed lines indicate the original position of moveable electrode 30.

In the use of voltage to drive the structure of drive comb 10, force is defined as:

$$F_y = \frac{1}{2} V^2 \frac{\partial C}{\partial y} = f(V^2)$$

By assuming that the voltage has the form as follows:

$$V = DC + AC\sin(\omega t) \Rightarrow (DC + AC\sin(\omega t))^2 =$$
$$DC^2 + 2*DC*AC*\sin(\omega t) + AC^2\sin(\omega t)^2 \xrightarrow{\sin(x)^2 \sim \frac{1}{2}\cos(2x)}$$
$$DC^2 + 2*DC*AC*\sin(\omega t) + \frac{1}{2}AC^2\cos(2\omega t),$$

the drive comb structure can be driven by either DC+AC voltage at frequency ω or AC only at frequency 2ω. When sinusoidal/periodic motion is required, typically for MEMS gyroscopes, the voltage is varied by AC value at the resonant frequency and the movable structure is pushed towards the static structure. The force acting in the opposite direction is created by response of the suspension, or the force can be further implemented by the so called push/pull approach when two drive combs are placed on the opposite sides of a moveable structure and the voltage for driving has opposite phase: $V_L$=DC-AC and $V_R$=DC+AC. Such an arrangement is shown in FIGS. 2A and 2B for a MEMS device 60, where a pair of fixed drive comb electrodes 62 and 64 are located on opposite sides of a moveable electrode 70. A voltage ($V_L$) is applied on the left side of MEMS device 60 between drive comb electrode 62 and moveable electrode 70, and a voltage ($V_R$) is applied on the right side of MEMS device 60 between drive comb electrode 64 and moveable electrode 70. As depicted in FIG. 2A, when $V_L$ is greater than $V_R$, a force indicated by arrow 72 drives movable electrode 70 toward drive comb electrode 62. As depicted in FIG. 2B, when $V_L$ is less than $V_R$, a force indicated by arrow 74 drives movable electrode 70 toward drive comb electrode 64.

Accordingly, the force is independent of displacement of the movable structures in the y direction, and can achieve a large displacement limited only by the length of the comb fingers. By rotating the actuator by 90 degrees, the actuator in a perpendicular direction can be implemented enabling both directional actuation in the x and y directions independent of displacement. The problematic part is the actuation in the out-of-plane direction, where the drive comb cannot be used in the way it is in the in-plane direction.

An out-of-plane actuator can be implemented by a parallel plate, or by a drive comb of a MEMS device. Based on the type of drive comb, and whether or not there is symmetry beneath and above the drive comb, two forces can be distinguished. For a symmetrical drive comb, there is the force that always tries to push the movable part towards the static part. This is described by the equation in Table 1 above (Z direction). For a non-symmetrical drive comb (single sided technology), there is the levitation force, which always pushes the movable part above the static part (makes it levitate). The substrate (silicon or electrode below the drive comb) is typically grounded for the non-symmetrical drive comb.

FIGS. 3A-3D illustrate a MEMS sensor device 100 according to one embodiment, to which the present approach can be applied. The MEMS sensor device 100 generally includes a support substrate 104, and a proof mass 110 movably connected to substrate 104. A first drive comb 120 and a second drive comb 130 are oppositely oriented on either side of proof mass 110 and are fixedly connected to substrate 104. A parallel plate sense electrode 140 is located under proof mass 110 on substrate 104.

The proof mass 110 is configured to oscillate back and forth over support substrate 104 between drive combs 120 and 130, both of which remain stationary over substrate 104 to limit movement of proof mass 110. Extending outwardly from opposing ends of proof mass 110 are a first set of comb fingers 112 and a second set of comb fingers 114, which are used to electrostatically drive proof mass 110.

The first drive comb 120 has a first set of comb fingers 122, which can be interdigitated with the first set of comb fingers 112 on proof mass 110. Likewise, the second drive comb 130 has a second set of comb fingers 132, which can be interdigitated with the second set of comb fingers 114 on proof mass 110.

The foregoing components of MEMS device 100 can be connected to substrate 104 through various suspension structures (not shown).

The parallel plate sense electrode 140 can include a rectangular-shaped electrode plate positioned and oriented in a manner such that an upper face of parallel plate sense electrode 140 is vertically adjacent to and parallel with the underside of proof mass 110. In the implementation shown, the drive comb is divided into two parts such that the overlap is always constant, and parallel plate sense electrode 140 is entirely beneath proof mass 110.

Levitation Force

The levitation force occurs when there is nonsymmetrical electrical field as a result of a plate beneath the substrate, which is biased at the same voltage. The levitation force is described by the following equation:

$$F = \gamma_{z0} V^2 \frac{(z_0 - z)}{z_0}$$

where $\gamma_{z0}$ is linked to the design of the comb and describes the ratio between force and square of applied voltage for specific overlap. The unit of $\gamma_{Z0}$ is N/V² and a typical value is in the range of fraction of nN per V². The parameter $z_0$ is the equilibrium position. The equilibrium position defines the maximal displacement that can be achieved by the levitation force. If there is no mechanical restoring spring constant, the structure would always levitate at $z_0$. At equilibrium position the electrostatic field distribution is in balance. If the structure gets beyond the equilibrium point, the electrostatic force pushes the structure downwards back to the equilibrium. The close form of the levitation force for z=0 is described by the following equation:

$$F = \varepsilon_0 \frac{swV^2}{2\delta^2}$$

where:

$$\delta = \frac{d}{\sqrt{G(p)}}$$

$$G(p) = \left(\frac{4}{\pi}\right)^2 \sum_{k,l=0}^{\infty} \left\{\frac{\cos\left[(2k+1)\frac{\pi}{2}\frac{1}{1+p}\right]}{2k+1}\right\}\left\{\frac{\cos\left[(2l+1)\frac{\pi}{2}\frac{1}{1+p}\right]}{2l+1}\right\}$$

$$\left\{SINC\left[\frac{\pi}{1+p}(k+l+1)\right] + SINC\left[\frac{\pi}{1+p}(k-l)\right]\right\}$$

$$p = \frac{d}{w}$$

Where w is the width of the finger comb, d is the gap between fingers, $\varepsilon_0$ is permittivity of air, s is the overlap between the static and movable fingers, and SINC(x) is defined as sin(x)/x. Therefore, $\gamma_{z0}$ or simply just $\gamma$ can be in close form calculated as:

$$\gamma = \varepsilon_0 \frac{sw}{2\delta^2}.$$

The force as a linear function of displacement is defined by:

$$F = \gamma V^2 - \frac{\gamma V^2}{z_0} z$$

This equation describes the behavior of the levitation force. The closer the movable structure is towards the substrate, the larger the force is. When the structure reaches equilibrium distance $z_0$ the force is 0. The force is linearly proportional to displacement in out-of-plane. Both $\gamma$ and $z_0$ are factors linked to geometry (overlap, width of comb finger, gap between fingers, etc.). The levitation force always acts towards the equilibrium point.

Parallel Plate Force

The parallel plate force is defined by:

$$F = \varepsilon_0 \frac{S}{2(g_0 + z)^2} V^2$$

where S equals the area of the parallel plate, $g_0$ is the gap between the movable and static plates, and z is the displacement in the out of plane direction (z=0 when there is no deflection and is negative when the movable structure moves towards the fixed electrode). This equation describes the force acting on the structure when there is only one parallel plate (one sided technology). This function can be linearized by a Taylor polynomial around z=0 as follows:

$$F = \frac{\varepsilon_0 S V^2}{2} \left( \frac{1}{g_0^2} + \frac{2z}{g_0^3} + \frac{3z^2}{g_0^4} + \frac{4z^3}{g_0^5} + \cdots \right)$$

and keeping only the first two terms:

$$F = \frac{\varepsilon_0 S V^2}{2 g_0^2} + \frac{\varepsilon_0 S V^2}{g_0^3} z.$$

Within the validity of the Taylor polynomial expansion, this equation has two terms:
1) a term independent of displacement, where force is a function of geometry and applied voltage; and
2) a term that linearly depends on displacement and where the force is a function of geometry and applied voltage.

The parallel plate force always acts downwardly (towards the substrate and the closer to the substrate, the larger the force is).

Combination of Levitation and Parallel Plate Forces

Combining the equation for the parallel plate force $$\left( \frac{\varepsilon_0 S V^2}{2 g_0^2} + \frac{\varepsilon_0 S V^2}{g_0^3} z \right)$$

with the equation for the levitation force $$\left( \gamma V^2 + \left( -\frac{\gamma V^2}{z_0} \right) z \right),$$

leads to the expression:

$$F = \frac{\varepsilon_0 S V^2}{2 g_0^2} - \gamma V^2 + \left( -\frac{\gamma V^2}{z_0} + \frac{\varepsilon_0 S V^2}{g_0^3} \right) z.$$

This implies that by designing a structure such that $$\frac{\gamma}{z_0} = \frac{\varepsilon_0 S}{g_0^3},$$

a linear actuator can be achieved that can be driven by single voltage V. Alternatively, the comb drive can be actuated by voltage $V_2$ and the parallel plate by voltage $V_1$, resulting in the expression for the force:

$$F = \frac{\varepsilon_0 S V_1^2}{2 g_0^2} - \gamma V_2^2 + \left( -\frac{\gamma V_2^2}{z_0} + \frac{\varepsilon_0 S V_1^2}{g_0^3} \right) z.$$

If the manufacturing technology (gap between the structure and the substrate, minimal separation between drive comb fingers, etc.) does not allow achievement of the above mentioned condition, the linear actuator can be also achieved by using voltages with a fixed ratio for which:

$$\frac{V_1}{V_2} = \sqrt{\frac{g_0^3 \gamma}{\varepsilon_0 S z_0}}$$

The independent term of displacement for this linear actuator $$\frac{\varepsilon_0 S V^2}{2 g_0^2} - \gamma V^2$$

implies that both forces act in opposite directions. By designing the actuator such that $$\frac{\varepsilon_0 S}{2 g_0^2} > \gamma,$$

a push actuator can be designed (force pointing downward), or if $$\frac{\varepsilon_0 S}{2g_0^2} < \gamma$$

a pull actuator can be designed (force pointing upward). The condition for push and pull actuation could be further simplified by adding condition for linearization $$\frac{\gamma}{z_0} = \frac{\varepsilon_0 S}{g_0^3}$$

or $$\frac{V_1}{V_2} = \sqrt{\frac{g_0^3 \gamma}{\varepsilon_0 S z_0}}$$

resulting in condition $$\frac{g_0}{2z_0} > 1$$

for push actuator and $$\frac{g_0}{2z_0} < 1$$

for pull actuator.

Figure 4A:
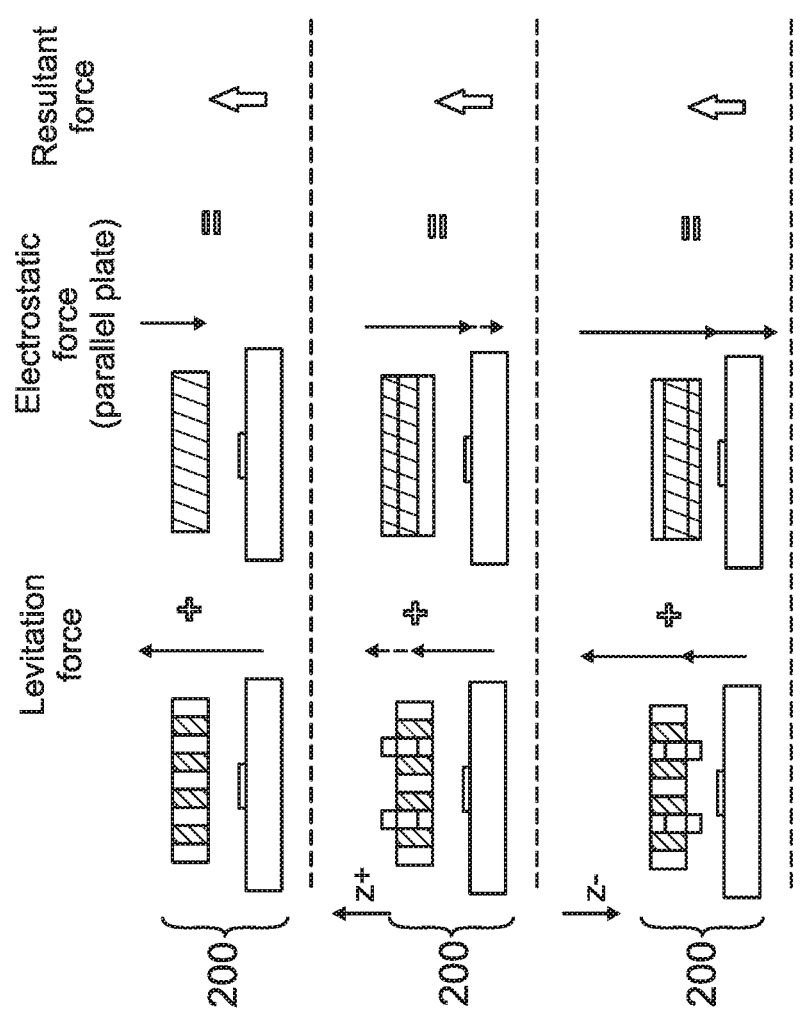
FIGS. 4A and 4B show cross-sectional side views of a MEMS sensor device, showing the combination of levitation and parallel plate forces acting on the MEMS sensor device.

The combination of the levitation force with the parallel plate force is illustrated in FIG. 4A for a MEMS sensor device 200 similar to that shown in FIGS. 3A-3D. In this case, the levitation force is larger corresponding to $$\frac{\varepsilon_0 S V^2}{2g_0^2} < \gamma \text{ or } \frac{g_0}{2z_0} < 1$$

condition, so the linearized force points upward.

Figure 4B:
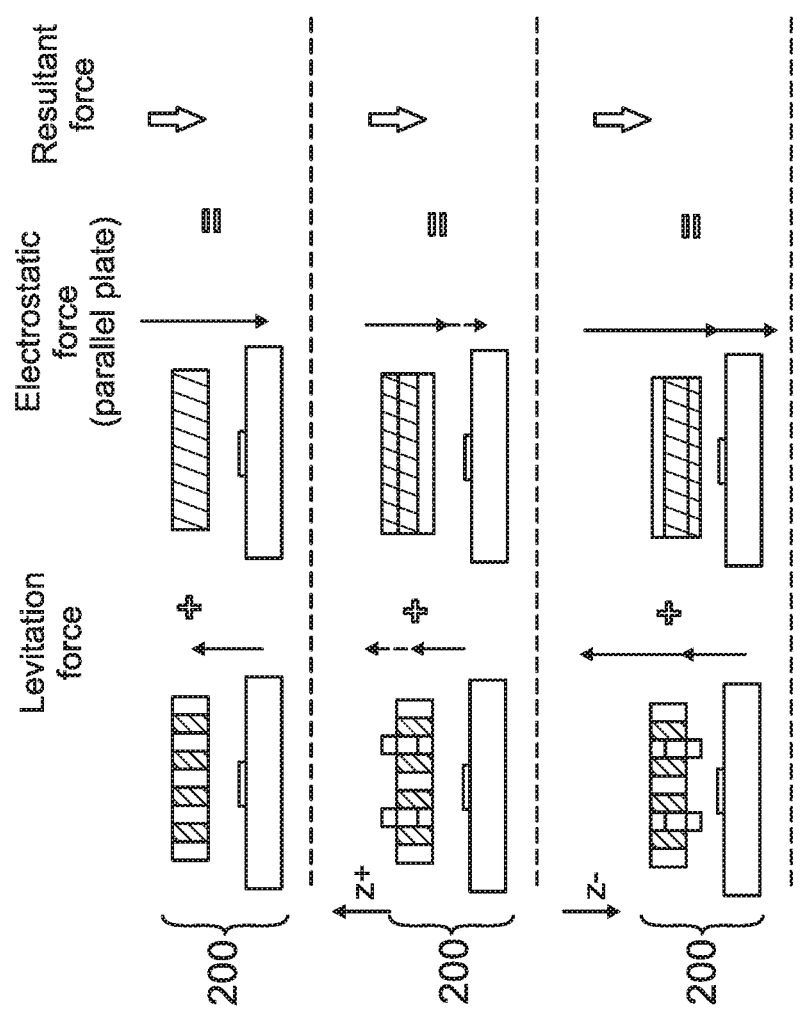

The combination of the levitation force with the parallel plate force is also illustrated in FIG. 4B for MEMS sensor device 200. In this case, the parallel plate force is larger, corresponding to $$\frac{\varepsilon_0 S}{2g_0^2} > \gamma \text{ or } \frac{g_0}{2z_0} > 1$$

condition, so the linearized force points downward.

Figure 5A:
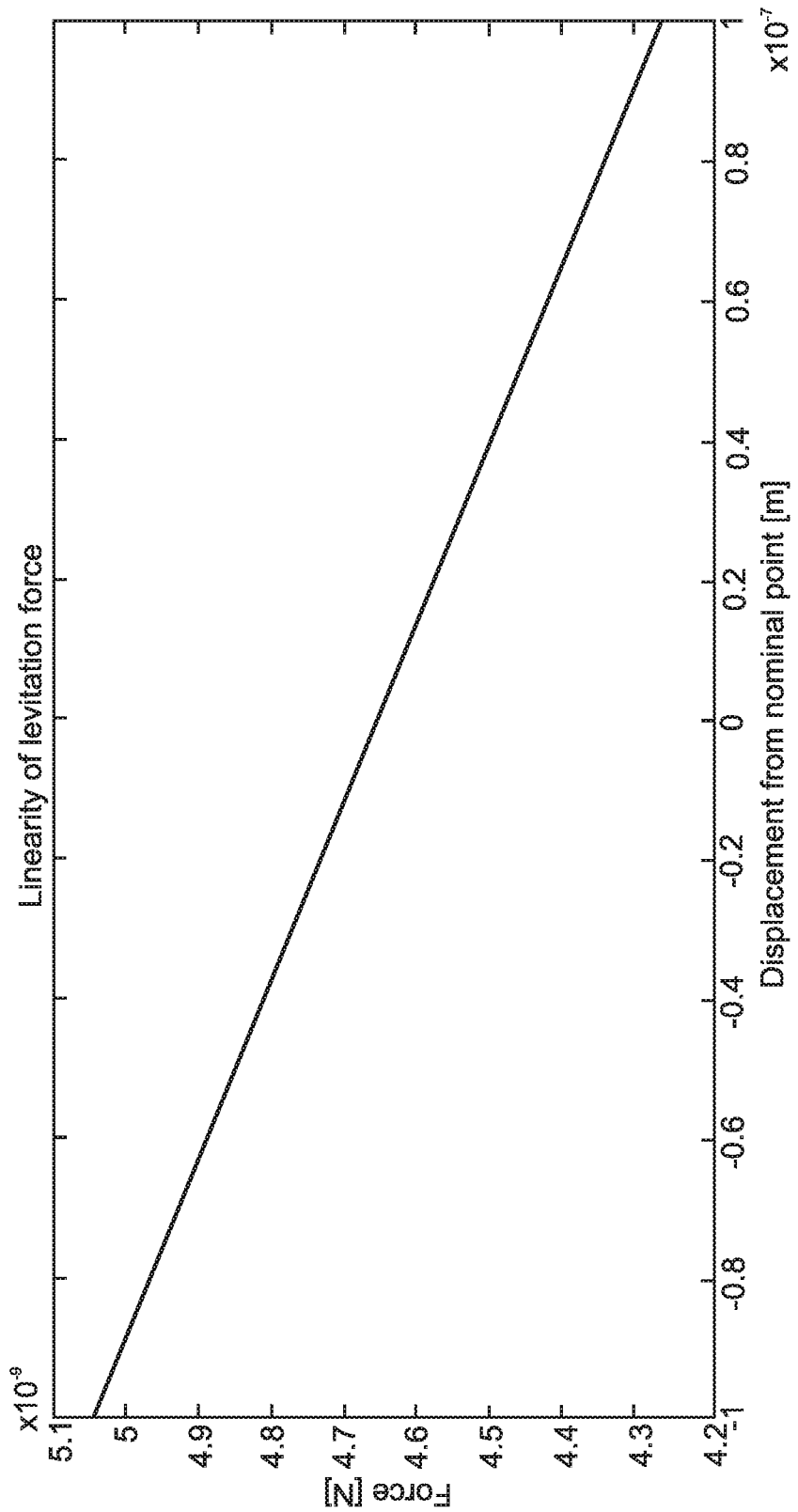
FIG. 5A is a graph of linearity for the levitation force, with respect to displacement along the z axis.
Figure 5B:
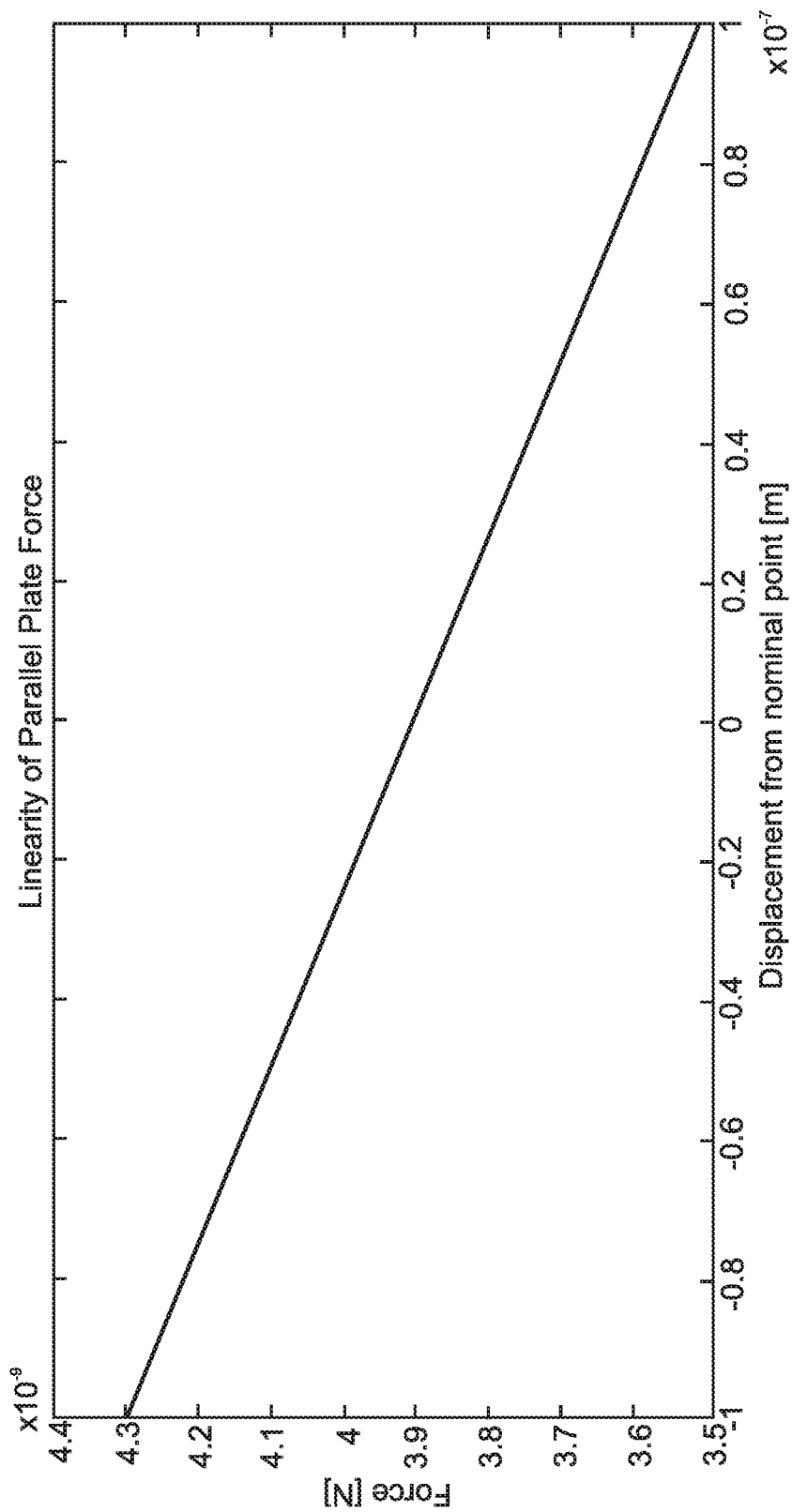
FIG. 5B is a graph of linearity for the parallel plate force, with respect to displacement along the z axis.
Figure 5C:
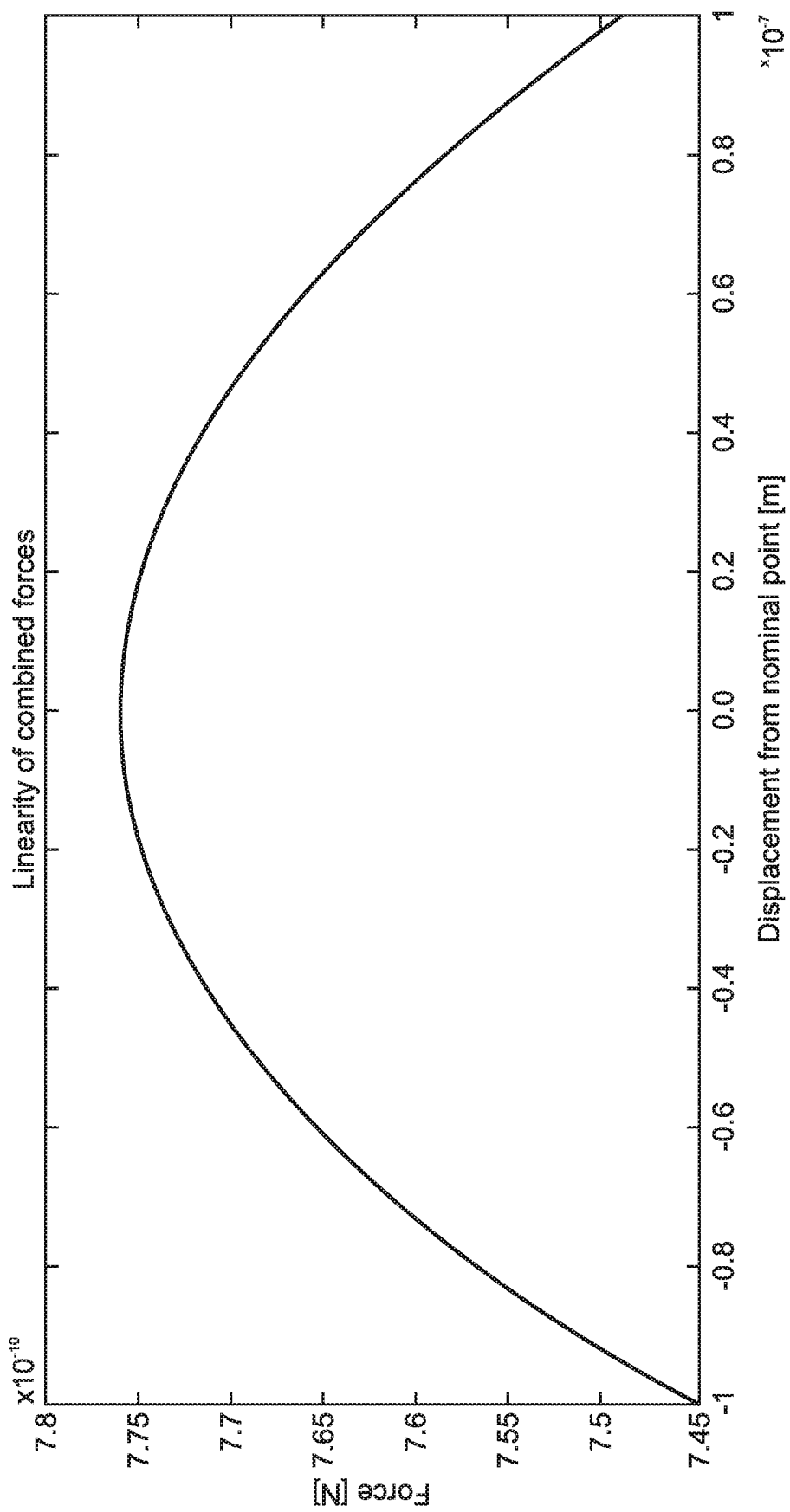
FIG. 5C is a graph showing the combined levitation and parallel plate forces, with respect to displacement along the z axis.

When the condition for linearization is fulfilled, a force can be obtained as shown in the graphs of FIGS. 5A-5C. FIG. 5A shows the linearity of levitation force within 100 nm of displacement in the z axis from the initial position. FIG. 5B shows the linearity of parallel plate force within 100 nm of displacement in the z axis from the initial position. FIG. 5C shows the linearity of combined levitation and parallel plate forces, within 100 nm of displacement in the z axis from the initial position.

Furthermore, if the actuator is designed such that the area is constant with respect to in-plane movement, the force is independent of in-plane motion. The dependence on in-plane deflection is apparent from equations (both the area of the parallel plate and overlap of the drive comb depends on in-plane motion), which makes both forces dependent on y deflection. The parallel plate depends on in-plane deflection as follows:

$$F(y, z, V) = \varepsilon_0 \frac{1}{2(g_0 + z)^2} (S_0 + S_y) V^2$$

and the levitation force as follows:

$$F(y, z, V) = \left(1 - \frac{z}{z_0}\right)(\gamma + \gamma_y) V^2$$

where index y implies that that part depends on the displacement. However, when the geometry is designed such that the plate and/or the overlap does not change (or rather sum of several drive combs), the force is independent of displacement.

Figure 6:
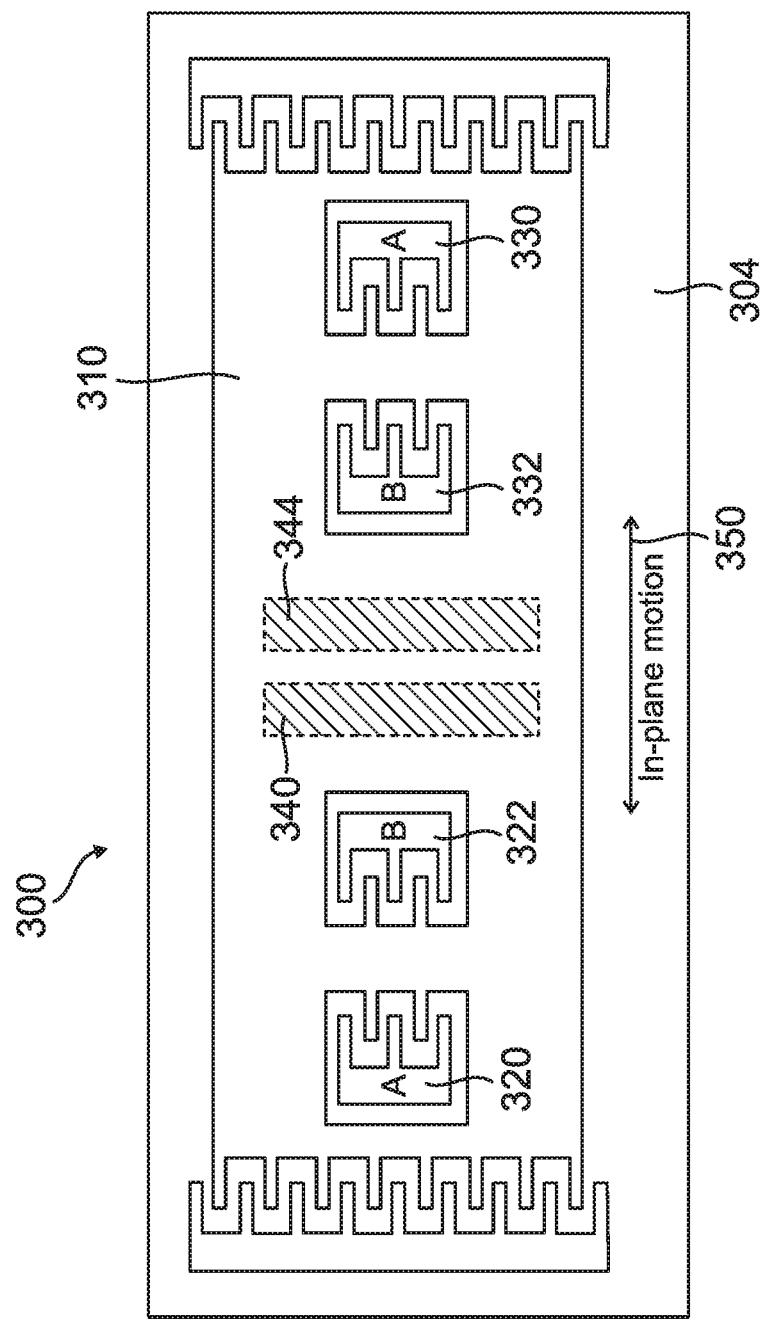
FIG. 6 is a top view of a MEMS sensor device according to another embodiment, which can be implemented as an out of plane actuator.

FIG. 6 illustrates a MEMS sensor device 300 according to another embodiment, to which the present approach can be applied. The MEMS sensor device 300 includes a support substrate 304, and a proof mass 310 movably connected to substrate 304. A first pair of drive combs 320, 322 with opposite orientations (A and B), and a second pair of drive combs 330, 332 with an opposite orientations (A and B), are both fixedly connected to substrate 304. A pair of parallel plate sense electrodes 340, 344 is located under proof mass 310 on substrate 304.

The proof mass 310 is configured to move back and forth in-plane over support substrate 304 as indicated by arrow 350. The first pair of drive combs 320, 322 each include comb fingers, which can be interdigitated with adjacent comb fingers of proof mass 310. Likewise, the second pair of drive combs 330, 332 each include comb fingers, which can be interdigitated with adjacent comb fingers of proof mass 310.

Figure 7:
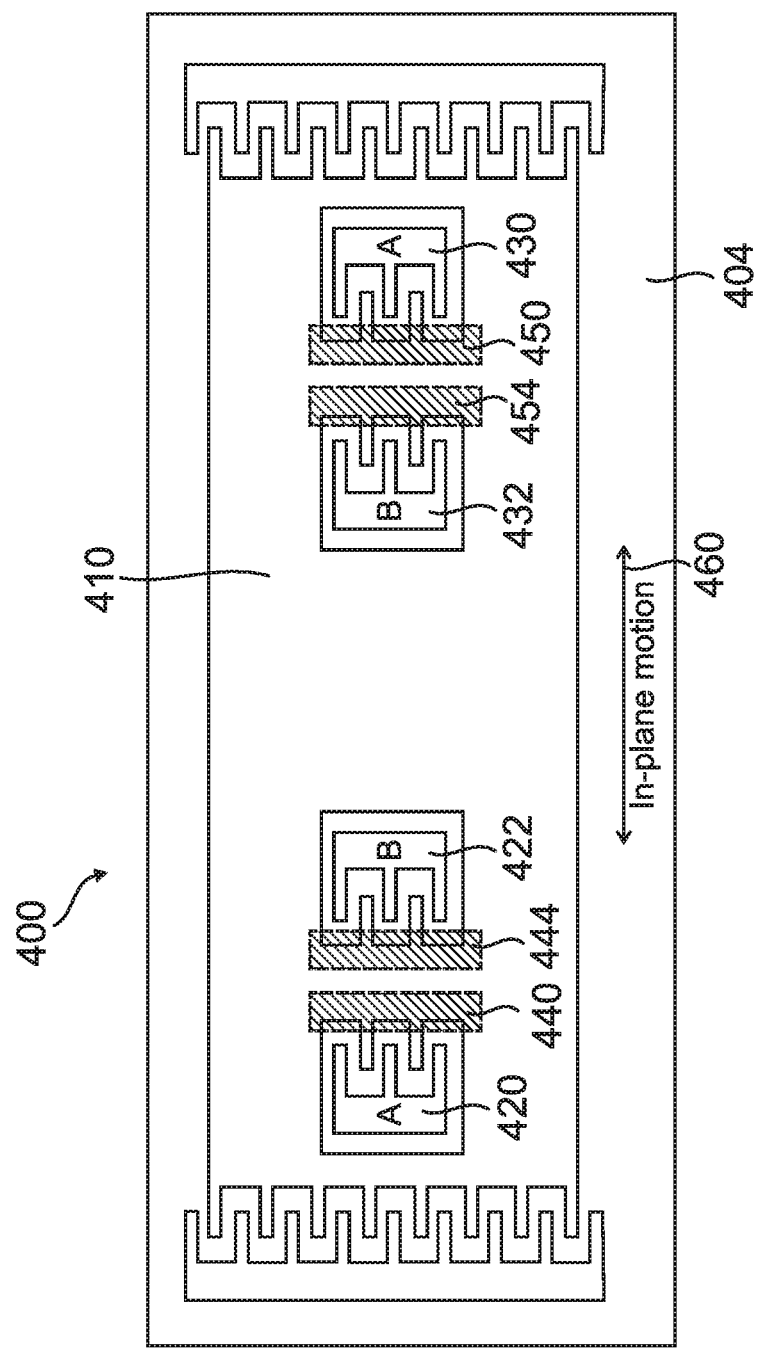
FIG. 7 is a top view of a MEMS sensor device according to an alternative embodiment, which can be implemented as an out of plane actuator.

FIG. 7 illustrates a MEMS sensor device 400 according to an alternative embodiment, to which the present approach can be applied. The MEMS sensor device 400 includes a support substrate 404, and a proof mass 410 movably connected to substrate 404. A first pair of drive combs 420, 422 with opposite orientations (A and B), and a second pair of drive combs 430, 432 with opposite orientations (A and B), are both fixedly connected to substrate 404. A first pair of parallel plate sense electrodes 440, 444 is located under proof mass 410 on substrate 404 in an overlapping arrangement with drive combs 420, 422. A second pair of parallel plate sense electrodes 450, 454 is located under proof mass 410 on substrate 404 in an overlapping arrangement with drive combs 430, 432.

The proof mass 410 is configured to move back and forth in-plane over support substrate 404 as indicated by arrow 460. The first pair of drive combs 420, 422 each include comb fingers, which can be interdigitated with adjacent comb fingers of proof mass 410. Likewise, the second pair of drive combs 430, 432 each include comb fingers, which can be interdigitated with adjacent comb fingers of proof mass 410.

By using the drive combs with opposite orientations with the same voltages in the MEMS sensor devices, and the fact that the in-plane force is independent of displacement, the sum of force for the in-plane motion is zero. The forces for the drive combs with opposite orientations should have both DC and AC components, which have opposite signs in order to decrease electrical feedthrough.

Figure 8:
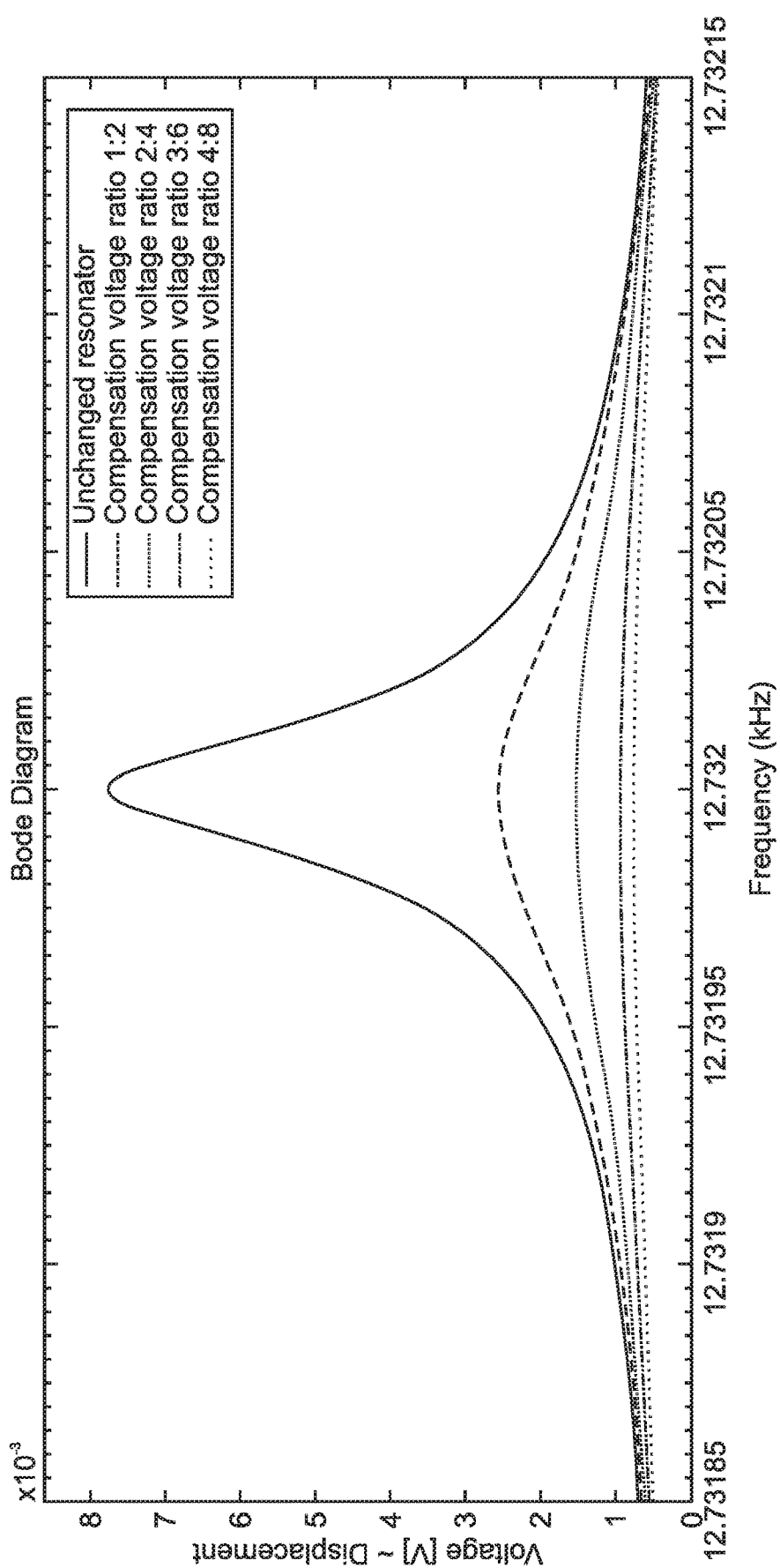
FIG. 8 is a graph showing experimental verification of control of motion demonstrated as an active damping of out-of-plane mode for a MEMS structure.

FIG. 8 is a graph showing experimental verification of control of motion demonstrated as an active damping of out-of-plane mode for a MEMS structure when both actuators with different voltage ratios were used. FIG. 8 shows movement control for a levitation and parallel plate combination, with the amplitude (out-of-plane displacement) being a function of frequency. This shows that active damping with the proposed actuator could achieve adjustment of damping by a factor of ten.

Example Embodiments

Example 1 includes a MEMS sensor device, comprising: a support substrate; a proof mass movably connected to the support substrate; a first drive comb fixedly connected to the support substrate in a first orientation and adjacent to the proof mass; a second drive comb fixedly connected to the support substrate in a second orientation and adjacent to the proof mass, the second orientation opposite of the first orientation such that the first and second drive combs face toward each other; and a parallel plate sense electrode located under the proof mass on the support substrate; wherein the first and second drive combs, and the parallel plate sense electrode, are each electrically charged and configured with respect to the proof mass such that a combination of a levitation force and a parallel plate force produces a linear out-of-plane actuation for the MEMS sensor device that depends only on an applied voltage.

Example 2 includes the MEMS sensor device of Example 1, wherein the proof mass includes a first set of comb fingers that extend in a first direction, and a second set of comb fingers that extend in an opposite second direction.

Example 3 includes the MEMS sensor device of Example 2, wherein: the first drive comb includes a first set of comb fingers, which are interdigitated with the first set of comb fingers of the proof mass; and the second drive comb includes a second set of comb fingers, which are interdigitated with the second set of comb fingers of the proof mass.

Example 4 includes the MEMS sensor device of any of Examples 1-3, wherein the drive combs are divided into two parts such that an overlap between the proof mass, and the first and second drive combs, is constant.

Example 5 includes the MEMS sensor device of Example 4, wherein the parallel plate sense electrode is entirely beneath the proof mass.

Example 6 includes the MEMS sensor device of Example 4, wherein the parallel plate sense electrode is located adjacent to the overlap.

Example 7 includes the MEMS sensor device of any of Examples 1-4, wherein the parallel plate sense electrode comprises a rectangular-shaped electrode positioned and oriented in a manner such that an upper face of the parallel plate sense electrode is vertically adjacent to and parallel with an underside of the proof mass.

Example 8 includes the MEMS sensor device of any of Examples 1-7, wherein the MEMS sensor device comprises a MEMS inertial sensor.

Example 9 includes the MEMS sensor device of any of Examples 1-8, wherein the MEMS sensor device comprises a gyroscope or an accelerometer.

Example 10 includes the MEMS sensor device of any of Examples 1-9, wherein the applied voltage comprises a DC signal, an AC signal, or combinations thereof.

Example 11 includes the MEMS sensor device of any of Examples 1-10, wherein the applied voltage is a single voltage.

Example 12 includes the MEMS sensor device of Example 11, wherein the MEMS sensor device has a geometric configuration defined by the equation:

$$\frac{\gamma}{z_0} = \frac{\varepsilon_0 S}{g_0^3}$$

where $\varepsilon_0$ is permittivity of air, S is an area of the parallel plate sense electrode, $g_0$ is a gap between the proof mass and the substrate, $z_0$ is equilibrium point (out-of-plane displacement) for the levitation force, and $\gamma$ is a scale factor for the levitation force.

Example 13 includes the MEMS sensor device of any of Examples 1-10, wherein the applied voltage comprises a first voltage applied to the parallel plate sense electrode, and a second voltage applied to the drive combs, the second voltage being different from the first voltage.

Example 14 includes the MEMS sensor device of any of Examples 1-10, wherein the applied voltage comprises a fixed ratio of voltages defined by:

$$\frac{V_1}{V_2} = \sqrt{\frac{g_0^3 \gamma}{\varepsilon_0 S z_0}}$$

where $\varepsilon_0$ is permittivity of air, $V_1$ is a voltage applied to the parallel plate sense electrodes, $V_2$ is a voltage applied to the drive combs, S is an area of the parallel plate sense electrodes, $g_0$ is a gap between the proof mass and the substrate, $z_0$ is equilibrium point (out-of-plane displacement) for the levitation force, and $\gamma$ is a scale factor of the levitation force.

Example 15 includes a MEMS inertial sensor, comprising: a support substrate; a proof mass movably connected to the support substrate; a first pair of drive combs fixedly connected to the support substrate in opposite orientations from each other and adjacent to the proof mass; a second pair of drive combs fixedly connected to the support substrate in opposite orientations from each other and adjacent to the proof mass; and a first pair of parallel plate sense electrodes located under the proof mass on the support substrate; wherein the first and second pairs of drive combs, and the first pair of parallel plate sense electrodes, are each electrically charged and configured with respect to the proof mass such that a combination of a levitation force and a parallel plate force produces a linear out-of-plane actuation for the MEMS sensor device that depends only on an applied voltage.

Example 16 includes the MEMS inertial sensor of Example 15, wherein the MEMS inertial sensor comprises a gyroscope or an accelerometer.

Example 17 includes the MEMS inertial sensor of any of Examples 15-16, further comprising a second pair of parallel plate sense electrodes located under the proof mass on the support substrate, wherein the first pair of parallel plate sense electrodes is in an overlapping arrangement with the first pair of drive combs, and the second pair of parallel plate sense electrodes is in an overlapping arrangement with the second pair of drive combs.

Example 18 includes the MEMS inertial sensor of any of Examples 15-17, wherein the applied voltage is a single voltage.

Example 19 includes the MEMS inertial sensor of Example 18, wherein the MEMS inertial sensor has a geometric configuration defined by the equation:

$$\frac{\gamma}{z_0} = \frac{\varepsilon_0 S}{g_0^3}$$

where $\varepsilon_0$ is permittivity of air, S is an area of the parallel plate sense electrodes, $g_0$ is a gap between the proof mass and the substrate, $z_0$ is equilibrium point (out-of-plane displacement) for the levitation force, and $\gamma$ is a scale factor of the levitation force.

Example 20 includes the MEMS sensor device of any of Examples 15-17, wherein the applied voltage comprises a fixed ratio of voltages defined by:

$$\frac{V_1}{V_2} = \sqrt{\frac{g_0^3 \gamma}{\varepsilon_0 S z_0}}$$

where $\varepsilon_0$ is permittivity of air, $V_1$ is a voltage applied to the parallel plate sense electrodes, $V_2$ is a voltage applied to the drive combs, S is an area of the parallel plate sense electrodes, $g_0$ is a gap between the proof mass and the substrate, $z_0$ is equilibrium point (out-of-plane displacement) for the levitation force, and $\gamma$ is a scale factor of the levitation force.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A MEMS sensor device, comprising:
a support substrate;
a proof mass movably connected to the support substrate;
a first drive comb fixedly connected to the support substrate in a first orientation and adjacent to the proof mass;
a second drive comb fixedly connected to the support substrate in a second orientation and adjacent to the proof mass, the second orientation opposite of the first orientation such that the first and second drive combs face toward each other;
a parallel plate sense electrode located under the proof mass on the support substrate;
a first voltage source operative to apply a first voltage $V_1$ to electrically charge the parallel plate sense electrode;
a second voltage source operative to apply a second voltage $V_2$ to electrically charge the first and second drive combs; wherein the first and second voltages are operatively applied in a fixed ratio defined by:

$$\frac{V_1}{V_2} = \sqrt{\frac{g_0^3 \gamma}{\varepsilon_0 S z_0}}$$

where $\varepsilon_0$ is the permittivity of air, S is an area of the parallel plate sense electrode, $g_0$ is a gap between the proof mass and the support substrate, $z_0$ is an equilibrium point for a levitation force, and $\gamma$ is a scale factor of the levitation force;
wherein the first and second drive combs, and the parallel plate sense electrode, are each electrically charged and configured with respect to the proof mass such that a combination of the levitation force and a parallel plate force produces a force for out-of-plane actuation of the MEMS sensor device that depends on the fixed ratio of the first and second voltages, thereby producing a vibration reduction of the MEMS sensor device.

2. The MEMS sensor device of claim 1, wherein the proof mass includes a first set of comb fingers that extend in a first direction, and a second set of comb fingers that extend in an opposite second direction.

3. The MEMS sensor device of claim 2, wherein:
the first drive comb includes a first set of comb fingers, which are interdigitated with the first set of comb fingers of the proof mass; and
the second drive comb includes a second set of comb fingers, which are interdigitated with the second set of comb fingers of the proof mass.

4. The MEMS sensor device of claim 1, wherein the drive combs are divided into two parts such that an overlap between the proof mass, and the first and second drive combs, is constant.

5. The MEMS sensor device of claim 4, wherein the parallel plate sense electrode is entirely beneath the proof mass.

6. The MEMS sensor device of claim 4, wherein the parallel plate sense electrode is located adjacent to the overlap.

7. The MEMS sensor device of claim 1, wherein the parallel plate sense electrode comprises a rectangular-shaped electrode positioned and oriented in a manner such that an upper face of the parallel plate sense electrode is vertically adjacent to and parallel with an underside of the proof mass.

8. The MEMS sensor device of claim 1, wherein the MEMS sensor device comprises a MEMS inertial sensor.

9. The MEMS sensor device of claim 1, wherein the MEMS sensor device comprises a gyroscope or an accelerometer.

10. The MEMS sensor device of claim 1, wherein the first and second voltages each comprise a DC signal, an AC signal, or combinations thereof.

11. The MEMS sensor device of claim 1, wherein the MEMS sensor device has a geometric configuration defined by the equation:

$$\frac{\gamma}{z_0} = \frac{\varepsilon_0 S}{g_0^3}.$$

12. The MEMS sensor device of claim 1, wherein the second voltage is different from the first voltage.

13. A MEMS inertial sensor, comprising:
a support substrate; a proof mass movably connected to the support substrate;
a first pair of drive combs fixedly connected to the support substrate in opposite orientations from each other and adjacent to the proof mass;

a second pair of drive combs fixedly connected to the support substrate in opposite orientations from each other and adjacent to the proof mass; and a first pair of parallel plate sense electrodes located under the proof mass on the support substrate;

a first voltage source operative to apply a first voltage $V_1$ to electrically charge the first pair of parallel plate sense electrodes;

a second voltage source operative to apply a second voltage $V_2$ to electrically charge the first and second pairs of drive combs;

wherein the first and second voltages are operatively applied in a fixed ratio defined by:

$$\frac{V_1}{V_2} = \sqrt{\frac{g_0^3 \gamma}{\varepsilon_0 S z_0}}$$

where $\varepsilon_0$ is the permittivity of air, S is an area of the first pair of parallel plate sense electrodes, $g_0$ is a gap between the proof mass and the support substrate, $z_0$ is an equilibrium point for a levitation force, and $\gamma$ is a scale factor of the levitation force;

wherein the first and second pairs of drive combs, and the first pair of parallel plate sense electrodes, are each electrically charged and configured with respect to the proof mass such that a combination of the levitation force and a parallel plate force produces a force for out-of-plane actuation of the MEMS inertial sensor that depends on the fixed ratio of the first and second voltages, thereby producing a vibration reduction of the MEMS inertial sensor.

14. The MEMS inertial sensor of claim 13, wherein the MEMS inertial sensor comprises a gyroscope or an accelerometer.

15. The MEMS inertial sensor of claim 13, further comprising a second pair of parallel plate sense electrodes located under the proof mass on the support substrate, wherein the first pair of parallel plate sense electrodes is in an overlapping arrangement with the first pair of drive combs, and the second pair of parallel plate sense electrodes is in an overlapping arrangement with the second pair of drive combs.

16. The MEMS sensor device of claim 13, wherein the MEMS sensor device has a geometric configuration defined by the equation:

$$\frac{\gamma}{z_0} = \frac{\varepsilon_0 S}{g_0^3}.$$

17. A method comprising:

providing a MEMS sensor device, comprising:

a proof mass movably connected to a substrate;

a first drive comb fixedly connected to the substrate in a first orientation and adjacent to the proof mass;

a second drive comb fixedly connected to the substrate in a second orientation and adjacent to the proof mass, the second orientation opposite of the first orientation such that the first and second drive combs face toward each other; and a parallel plate sense electrode located under the proof mass on the substrate; applying a first voltage $V_1$ to the parallel plate sense electrode to electrically charge the parallel plate sense electrode;

applying a second voltage $V_2$ to the first and second drive combs to electrically charge the first and second drive combs;

wherein the first and second voltages are applied in a fixed ratio defined by:

$$\frac{V_1}{V_2} = \sqrt{\frac{g_0^3 \gamma}{\varepsilon_0 S z_0}}$$

where $\varepsilon_0$ is the permittivity of air, S is an area of the parallel plate sense electrode, $g_0$ is a gap between the proof mass and the substrate, $z_0$ is an equilibrium point for a levitation force, and $\gamma$ is a scale factor of the levitation force;

wherein the parallel plate sense electrode, and the first and second drive combs, are electrically charged such that a combination of the levitation force and a parallel plate force produces a linear out-of-plane actuation of the MEMS sensor device that depends on the fixed ratio of the first and second applied voltages.

18. The method of claim 17, wherein the MEMS sensor device has a geometric configuration defined by the equation:

$$\frac{\gamma}{z_0} = \frac{\varepsilon_0 S}{g_0^3}.$$

19. The method of claim 17, wherein the MEMS sensor device comprises a MEMS inertial sensor.

20. The method of claim 17, wherein the MEMS sensor device comprises a gyroscope or an accelerometer.

* * * * *